April 20, 1965  P. K. BLOCH ETAL  3,178,933
METHOD AND APPARATUS FOR ULTRASONIC WELD INSPECTION AND DISPLAY
Filed Sept. 8, 1960  4 Sheets-Sheet 1

INVENTORS
Peter K. Bloch
Elliott A. Henry
BY
Blair, Spencer + Buckles
ATTORNEYS

United States Patent Office 3,178,933
Patented Apr. 20, 1965

3,178,933
METHOD AND APPARATUS FOR ULTRASONIC WELD INSPECTION AND DISPLAY
Peter K. Bloch, Stamford, and Elliott A. Henry, Newtown, Conn., assignors to Branson Instruments, Inc., Stamford, Conn.
Filed Sept. 8, 1960, Ser. No. 54,716
9 Claims. (Cl. 73—67.8)

This invention relates to improvements in ultrasonic inspection of materials, and more particularly to an improved method and apparatus including cathode ray tube display systems for inspection of metal plate butt-joint weldments.

In ultrasonic materials inspection, particularly as employed for the detection and location of hidden flaws or defects, there exists the general and continuing problem of ascertaining the physical location of an internal reflecting discontinuity which may be a defect; one of the problems heretofore being the location of indicated ultrasonic reflections with respect to both the geometry of the test specimen and the position of the ultrasonic transducer. This problem becomes acute in those inspection applications where, to completely inspect the interior of a test specimen, it is necessary or desirable to introduce the ultrasound signals into the test specimen at an angle other than normal to the entrant surface.

Figure 5:
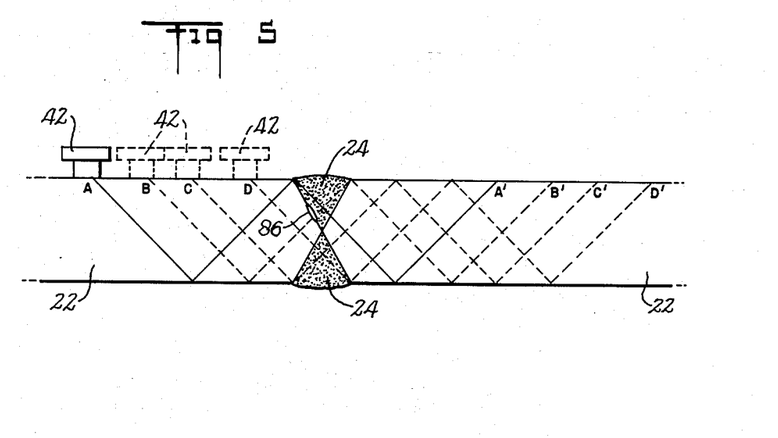
FIGURE 5 is an enlarged cross-sectional view of a butt-joint weldment, showing four successive positions of an ultrasonic inspection transducer and the paths traversed by ultrasound energy in each position.

A common example of this type of inspection is in the testing of specimens which consist of butt-joint welds in flat plate whose nominal thickness may vary from approximately ¼ inch to several inches. In such weldments, it is the practice to bevel the ends of the plates to be joined, and in the case of thicker plates, a double bevel may be applied to each edge, whereby when the plates are positioned in abutting relationship preparatory to welding, a broad V, or a double V with one inverted, appears in the cross-section of the abutment (as shown in FIGURE 5). With the apex of the beveled edges in abutting engagement, the welding rod may then be inserted to the center of the plates to be welded, and the remaining V shaped gaps between the two plates are filled in by the welder. Heretofore in the non-destructive ultrasonic inspection of such weldments, techniques have been employed, utilizing an Angle Beam Transducer to generate vibrations which are coupled into the test specimen at an angle approximately 45° to the plane of the entrant surface. The ultrasound energy thus introduced into the test specimen is repeatedly deflected between the relatively parallel opposing surfaces of the plate, unless a reflecting discontinuity is encountered. When such condition occurs, a portion of the ultrasound is reflected back toward its source, converted to electrical vibrations by the transducer, amplified and displayed on the face of a cathode ray tube which usually produces a visible plot of echo amplitude versus elapsed time from the initial pulse. Heretofore the fact that the time base of the cathode ray tube was essentially linear and that the ultrasound energy followed a "see-saw" or "saw tooth" path made indentification and location of the exact position of the defect extremely difficult, the interpretation of such displays being more of an art than a science.

In United States Patent No. 3,115,771, and assigned to the same assignee herein, there is described a method and means for simplifying the determination of the location of internal defects in such flat plate weldments by providing a pyramid wave time-base which simulates the path of the ultrasound energy as it is deflected between the relatively parallel opposed faces of the test specimen, the peaks of the pyramid wave corresponding to the surface boundaries of the part. The prior application also discloses circuitry for generating a gated pyramid wave with equal and linear rise and decay periods. The apparatus of the present invention, to be disclosed more fully hereinafter, constitutes an improvement over the invention of the aforesaid earlier application, and includes means for both the generation and use of the gated pyramid wave disclosed in the prior application.

One of the objects of the present invention is to provide an improved method and means for accurately locating hidden internal discontinuities in otherwise solid bodies.

A more particular object of the invention is to provide apparatus for simplifying the accurate detection and location of internal discontinuities in butt-joint weldments.

A further object of the invention is to provide an improved method of flaw detection and location which may be practiced by relatively unskilled persons, and which does not require elaborate or complicated interpretation techniques.

Another object of the invention is to provide improved means for more rapidly and accurately locating hidden flaws or material discontinuities by ultrasonic non-destructive testing.

A more specific object of the invention is to provide a relatively stationary visual display of a weld in cross-section, showing the paths traversed by ultrasonic energy with respect to the weld under inspection as motion is imparted to the testing instrument to scan the entire weld.

A further specific object of the invention is to provide a visual display simulating a cross-section of a piece being ultrasonically inspected and showing the relative location of echo producing discontinuities.

Other objects of the invention will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which.

Similar reference characters refer to similar elements throughout the several views of the drawings.

In the following disclosure, two cathode ray tube displays are described. The first will be designated as a "B-scan." This display shows substantially a cross-sectional view of the part being tested, the trace on the oscilloscope face corresponding to the path of ultrasonic energy through the part. Thus, the pyramid wave shown on the face of the cathode ray tube of the previously described U.S. Patent No. 3,115,771, when there are no defects in the part under test, is designated a "B-scan." "A-scan" as used herein designates a plot of echo amplitude versus time. In the present invention as in the previously referenced Patent No. 3,115,771, the display provided by the apparatus for the test operator is a modified "B-scan."

There are two major differences between previous "B-scan" presentations and that herein disclosed. The first of these is that the "acoustic time base" of the "B-scan" of the present invention, simulates the path of vibrations introduced into a test specimen at an angle and repeatedly deflected between the relative parallel opposed surfaces thereof, whereas previous "B-scan" presentations had an "acoustic time base" that related only to vibrations that were introduced into a test specimen normal to the entrance surface. The second difference is that in previous "B-scan" presentations the position of start of the "acoustic time base" was not related to the position of the ultrasonic transducer with respect to the test specimen or a portion of the specimen, while in the apparatus of the present invention, there is a definite relationship between the position of the start of the "acoustic time base" as shown on the face of the cathode ray tube and the position of the ultrasonic transducer with respect to the weld in the test specimen. An additional feature of the invention is the provision for modulating the brightness of the cathode ray display whereby echoes appear as bright spots on the display.

More particularly, referring to FIGURES 1, 2, 3 and 4, in the present invention there is provided a guide means generally indicated at 20, which is placed on the surface of a weldment 22 for inspection of a weld 24 therein. The guide means 20 comprises a guide rail 26, which may be an angle piece as shown, placed on the weldment 22 parallel to the weld 24. An end plate 28 has mounted thereon a pair of flanged wheels 30 and 32 which engage and ride on the guide rail 26. A carriage bar 34 is supported at one end by plate 28 and at the other end by a second plate 36 so that bar 34 is perpendicular to the guide rail 26 and parallel to the surface of the weldment 22. A large wheel 38 is mounted on the second plate 36 and rides on the surface of the weldment 22.

Figure 1:
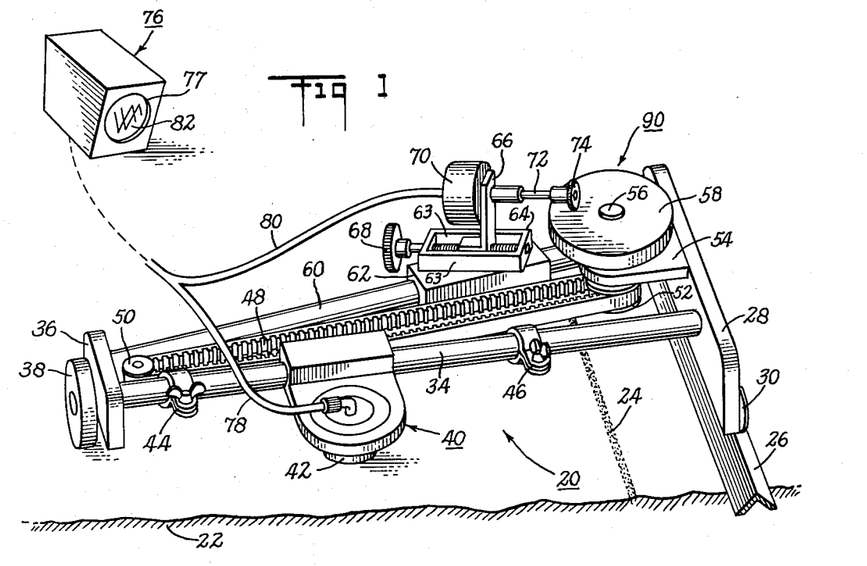
FIGURE 1 is a perspective view of one form of weld scanning apparatus embodying features of the invention.
Figure 2:
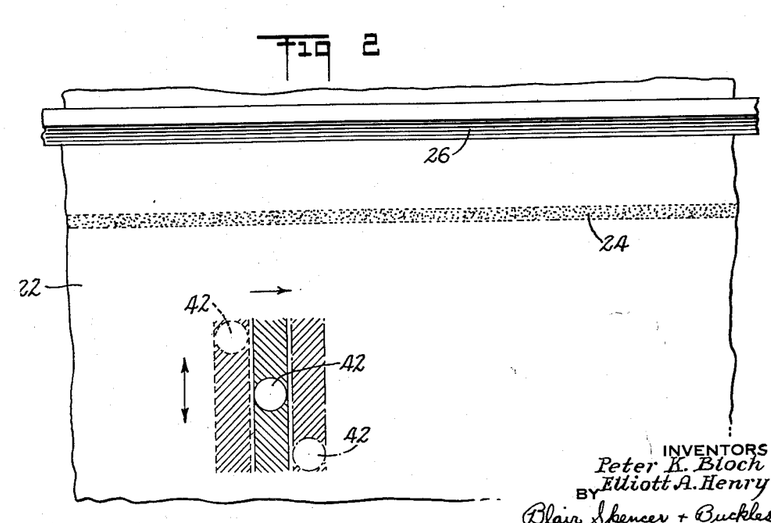
FIGURE 2 is a plan view of a plate weldment showing diagrammatically the directions of motion of the ultrasonic search unit, and successive positions thereof, as the scanner of the invention is operated to test the weld for the location of hidden discontinuities.
Figure 3:
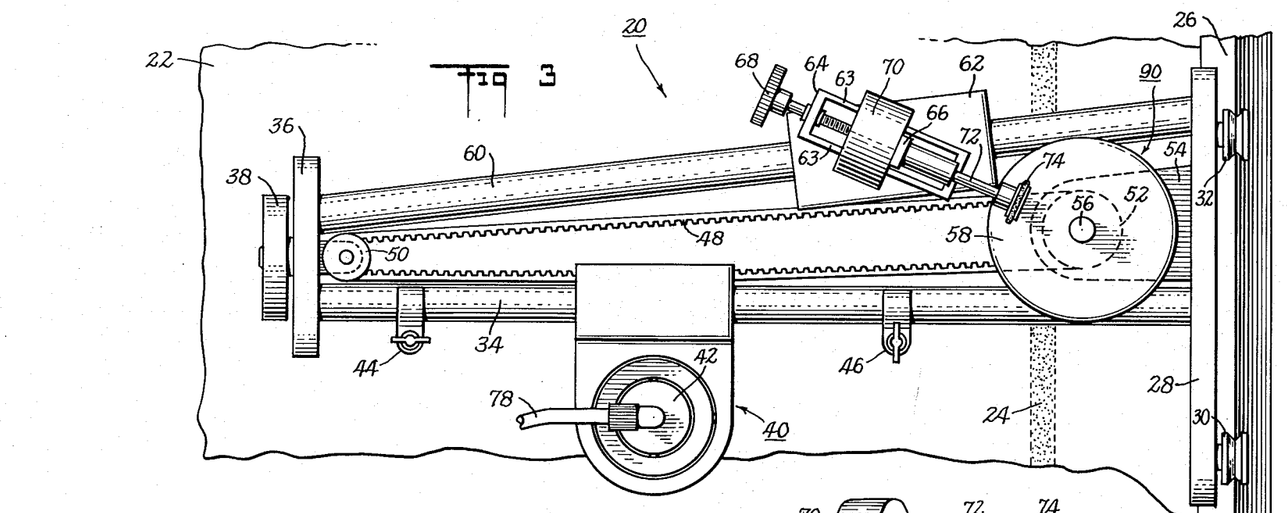
FIGURE 3 is a top view of the apparatus shown in FIGURE 1.
Figure 4:
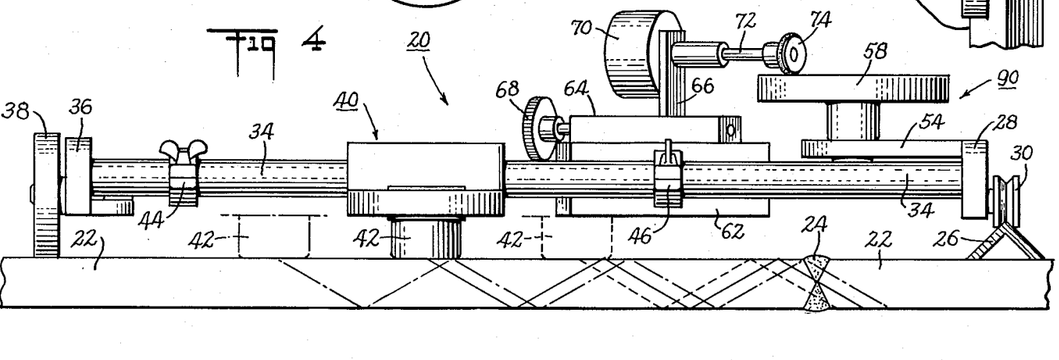
FIGURE 4 is a front view of the apparatus illustrated in FIGURES 1 and 3, showing in cross-section the butt-joint weld being inspected.

A carriage 40 is slidably mounted on the carriage bar 34. An angle beam ultrasonic transducer 42 is gimbal mounted in carriage 40 and, as best shown in FIGURE 2, may be moved in substantially parallel scanning paths each path substantially perpendicular to the weld 24, the transducer being guided by the carriage bar 34. This scanning of the transducer 42 toward and away from the weld 24 can be limited by presetting a pair of carriage stops 44 and 46 at preselected positions on carriage bar 34. After each scan perpendicular to the weld 24, the guide means may be moved parallel to the weld for a distance approximately equal to the diameter of the ultrasonic transducer 42. Thus, the whole weld 24 may be scanned.

A flexible belt 48 is rigidly connected to the carriage 40 and passes around a pulley 50 mounted to plate 36 with its axis vertical to the surface of weldment 22. The other end of belt 48 passes around a pulley 52 which is mounted on a bracket 54 supported on plate 28 above carriage bar 34. Pulley 52 is also mounted with its axis perpendicular to the weldment 22, pulleys 50 and 52 being disposed in substantially the same plane. The shaft 56 of pulley 52 passes through a bearing (not shown) in the bracket 54 and has a drive disc 58 mounted thereon above the bracket 54.

A reinforcing bar 60 is angularly disposed with respect to carriage bar 34, between end plates 28 and 36, and is supported at opposite ends thereof by plates 28 and 36. A potentiometer support block 62 is rigidly mounted on reinforcing bar 60. A potentiometer carriage guide 64 having substantially parallel guide slides 63—63 is mounted rigidly to the potentiometer support block 62 with the parallel slides 63—63 of the guide 64 being perpendicular to the shaft 56. A potentiometer carriage 66, having a generally L-shaped configuration, is adjustably mounted in the guide 64 by means of thumb screw 68. A double or ganged potentiometer 70 is mounted to the potentiometer carriage 66 with its rotatable control shaft 72 also perpendicular to the pulley shaft 56. A driven wheel 74 is mounted on the end of potentiometer drive shaft 72 and frictionally engages the drive disc 58. It will thus be seen that the movement of the ultrasonic transducer 42 toward and away from the weld 24 will rotate the shaft 72 of the ganged potentiometer 70, by means of the coupling belt 48, drive disc 58, and the driven wheel 74, the elements 48, 58 and 74 thus together constituting a position transducer. Thus, the stops 44–46 may be adjusted to provide the proper length of scan for a particular weldment and the thumb screw 68 may be adjusted to provide full stop to stop rotation of the double potentiometer 70. The necessity for providing full stop to stop rotation of the potentiometer 70 for any given scan will become apparent below in a discussion of the electronic circuitry of the invention.

Ultrasonic inspection display apparatus 76, including a cathode ray display tube oscilloscope 77, is connected to the ultrasonic transducer 42 by means of cable 78, and the double potentiometer 70 is also connected thereto by means of the cable 80.

Figure 6:
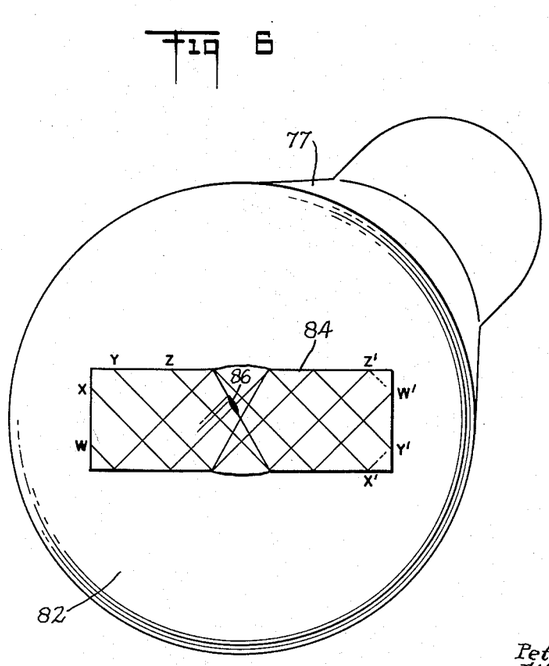
FIGURE 6 is a front view of a cathode ray tube display of the weld inspection illustrated in FIGURES 4 and 5, showing the presence of a defect in the weld.

Now referring to FIGURE 5, there is shown a cross-sectional view of the flat plate weldment 22 with the ultrasonic transducer 42 placed at different discrete distances from the weldment, i.e., the positions A, B, C, D. The dotted lines A/A', B/B', C/C', D/D' represent the paths of the ultrasonic beam for each corresponding position of the transducer 42. It should be understood, however, that the beam has a finite cross-section approximately equal to the area of contact between the transducer 42 and the weldment 22. Thus, it will be seen that if the transducer is moved between the positions A and D the entire cross-section of the weld will have been scanned by the ultrasonic beam. Now, if the base line of the cathode ray tube display is modulated by a pyramid wave whose rise and decay periods are equal to twice the propagation time of the ultrasonic beam between the opposed surfaces of the weldment along the paths shown in FIGURE 5, and if the position on the face of the cathode ray tube of the start of the first "pyramid" is made proportional to the position of the transducer, the pattern on the face of the cathode ray tube appears as is shown in FIGURE 6. In FIGURE 6 the traces W/W', X/X', Y/Y' and Z/Z' correspond to the ultrasonic beam paths A/A', B/B', C/C' and D/D'. If a transparency 84 bearing an outline drawing of the cross-section of the weldment 22, is placed on the face 82 of the cathode ray tube, the path of the ultrasonic beam with respect to the interior of the weldment 22 is instantly revealed. Should there be a defect in the weldment 22, such as the void 86 shown in FIGURE 5, this fact can be instantly displayed on the face 82 of the cathode ray tube when the echo signal from the defect 86 is made to brighten, that is intensity modulate, the cathode ray tube beam. In practice, the modulated pyramidal base line trace may be comparatively dim, having just sufficient brightness to be comfortably observed, while the echo signal is used to increase the cathode ray beam brightness to a maximum, thus showing the exact position of the defect 86 within the weldment 22.

Thus by relating the position of the ultrasonic transducer 42 to the start of the cathode ray tube base line, by providing a pyramid wave base line showing the path of the ultrasonic beam, by echo brightening this base line or trace, and by applying a transparency 84 showing the outline cross-section of the weldment 22, there is provided a method for instantaneously determining the exact position of the defect 86 in the weldment 22. This pictorial representation of the exact position of the defect within the weldment 22 requires no interpretation by the operator, a result not previously possible with any combination of ultrasonic apparatus.

Figure 7:
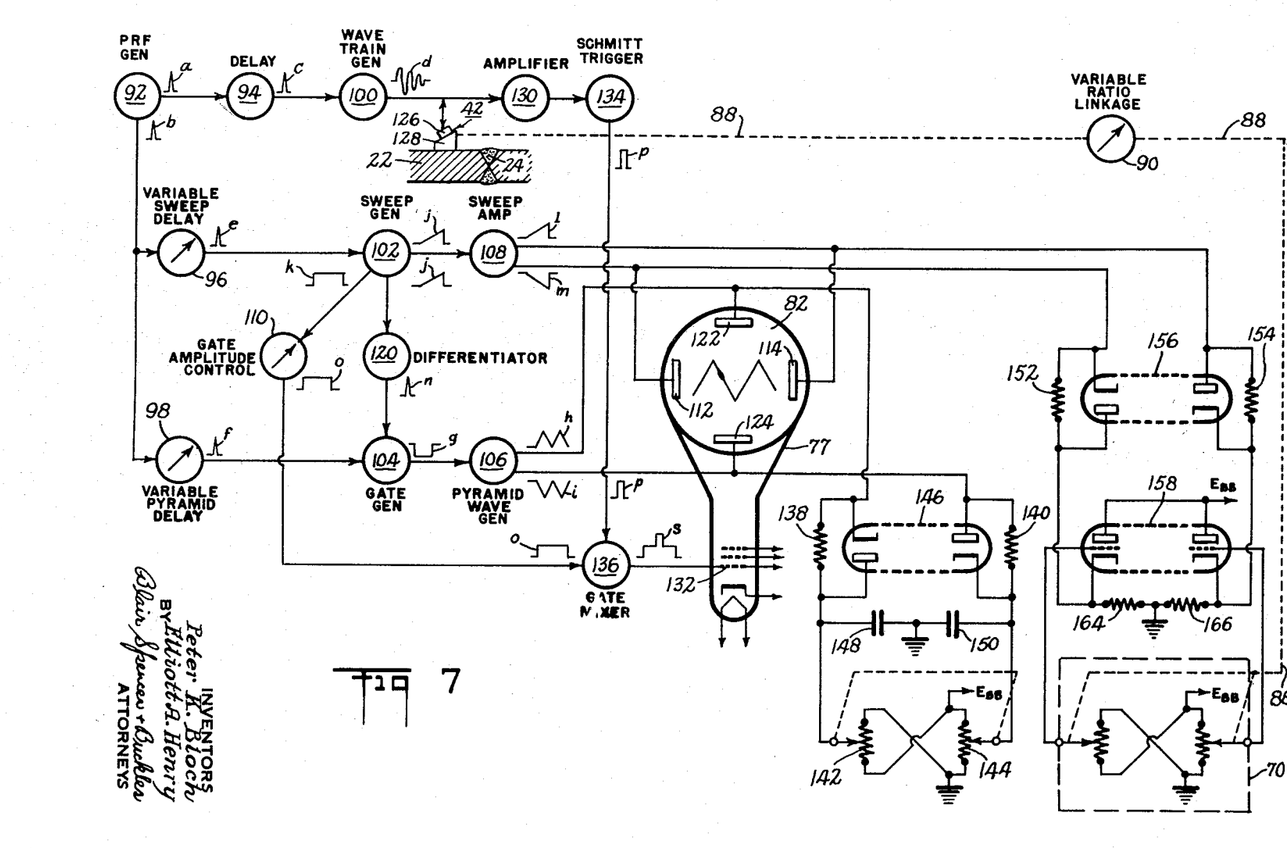
FIGURE 7 is a schematic circuit diagram with parts in block form of the electronic display apparatus employed with the structure of FIGURES 1 through 4.

Now referring to FIGURE 7 there is shown a schematic diagram of the apparatus of the present invention, the electronic circuitry being shown in detail. The mechanical connection between the ultrasonic transducer 42 and the ganged potentiometer 70 is indicated by the dotted line 88, and the variable ratio linkage including the drive disc 58 and driven disc 74 (FIGURES 1, 3 and 4) is generally indicated at 90. Timing pulses for the apparatus are generated by a pulse repetition frequency (PRF) generator 92 as repetition rates usually between 60 and 1,000 pulses per second. This PRF generator 92 comprises the system "clock" and the pulses or trigger signals $a$ and $b$ produced by this generator are delayed and shaped to provide the proper sequence of operation of the various other circuits of the complete system. The trigger signals are supplied to three circuits, a fixed wave train delay circuit 94, a variable sweep delay circuit 96 and a variable pyramid delay circuit 98. Each of these delay circuits 94, 96, 98 are of the type commonly known as delay or "one-shot" multivibrators.

The wave train delay 94 provides a delayed trigger $c$ which is supplied to and activates a wave train generator 100 at a time sufficiently delayed so that the cathode ray tube sweep circuit will have become operative before the wave train $d$ is supplied to the ultrasonic transducer 42. The sweep delay multivibrator 96 supplies a trigger $e$ to and initiates operation of a cathode ray sweep generator 102. Thus, the sweep of the cathode ray tube may be initiated by operator choice (i.e., by adjusting delay 96) either prior to, coincident with, or subsequent to the initial pulse generated by the wave train generator 100. The pyramid delay 98 provides a delay pulse $f$ for a pyramid wave gate generator 104 which upon receipt of this delayed pulse immediately generates a stepwave or gate $g$, which is supplied to a pyramid wave generator 106. The pyramid wave generator 106 generates pyramid waves $h$ and $i$ for modulating the sweep or time base of the cathode ray tube with the pyramid wave for the duration of the stepwave $g$ produced by the gate generator 104. Thus, the pyramid wave may also be initiated by operator choice (that is by adjusting the variable pyramid delay 98) either prior to, coincident with, or subsequent to the initial pulse generated by the wave train generator 100.

The delayed trigger pulse $e$ originating at the variable sweep delay 96 activates a screen coupled phantastron circuit, i.e., the sweep generator 102, which immediately provides a saw-toothed voltage $j$ coupled to a sweep amplifier 108, and a stepwave $k$ which is supplied to a gate amplitude control circuit 110. The phantastron circuit of the sweep generator 102 is particularly desirable in this circuit since it possesses a "self-gating" feature, that is, when the saw-toothed voltage reaches a predetermined amplitude, the phantastron circuit shuts itself off and awaits the next initiating trigger, thus producing the saw tooth wave form $j$ in FIGURE 7. This saw tooth or "sweep signal" is coupled to a paraphase sweep amplifier 108. Amplifier 108 is of the push-pull type and produces output waves $l$ and $m$ of identical shape and opposite polarity which are applied to the horizontal deflection plates 112 and 114 of the cathode ray tube 77.

The sweep wave $j$ generated by the sweep wave generator 102 is also supplied to a differentiator 120 which yields a trigger pulse $n$ coincident with the termination of the sweep wave. This trigger pulse is supplied to gate generator 104 and causes that generator to terminate the step wave $g$ generated therein. Thus, the pyramid wave generator will receive the gating step wave $g$ from the time the delayed pulse $f$ is supplied to the gate generator 104 by variable delay 98 until the time that the trigger signal $n$ is supplied by the differentiator to the gate generator 104. It will be seen by reference to the previously mentioned copending application Serial No. 819,042, that except for the addition of the gate control circuit 110, the portion of the circuit so far described herein is substantially identical to that shown in FIGURE 1 of the copending application, the variable pyramid delay 98 and gate generator 104 having been called the "variable marker gate delay" and "marker gate generator," respectively, in the previous application. For a more detailed description of this portion of the circuit, reference should be had to the aforesaid copending application.

The pyramid wave generator 106 of the present invention is the same as the pyramid wave generator described in the previous application except that it is combined with a push-pull or paraphase amplifier, similar to sweep amplifier 108, so that pyramid waves $h$ and $i$ of equal and opposite voltage may be supplied to the vertical deflecting plates 122 and 124 of the cathode ray tube 77. This reduces astigmatic distortion of the pyramidal trace on the face 82 of the cathode ray tube. As previously mentioned, the pyramid wave gate generator 104 is activated by the delayed trigger signal $f$ originating in the pyramid delay multivibrator 98, and de-activated at the end of the sweep period by the trigger signal $n$ originating in the differentiator 120. This eliminates the possibility of the system jamming as a result of improper adjustment of the periods of the various gates involved.

The electrical wave train $d$ generated by the wave train generator 100 is applied to a piezoelectric crystal 126 of the ultrasonic transducer 42, which converts the electrical vibrations into mechanical vibrations. The mechanical wave trains thus generated are longitudinal vibrations variously known as "main bang," "initial pulse," "ultrasonic pulse," etc. These wave trains are coupled to a wedge 128 through a suitable couplant such as a light machine oil. The vibrations after passing through the wedge 128 are coupled into the test piece 22 again through a suitable couplant, such as light machine oil. If the wedge 128 is made of the same material as the test piece 22 and the angle between the surface of the wedge 128 to which the piezoelectric crystal 126 is coupled and the upper surface of the test piece 22 is 45°, a beam of longitudinal vibrations will be produced in the part 22 which will be propagated in the part as shown in FIGURE 5.

The wedge 128 may also be made of material having slightly different acoustic properties than the test piece 22, and the angle appropriately chosen so that a beam of longitudinal vibration will still be propagated as shown in FIGURE 5. If the wedge is made of Lucite or Plexiglas, and the angle is approximately 32°, the ultrasound will upon entering the steel test specimen 22 be transformed into transverse vibrations or shearwaves and will be propagated in the specimen 22 at an angle of approximately 45°. It should be noted that this angle of 45° is not critical, but is considered the most desirable angle for weld inspection. Reflections from discontinuities within the test specimen 22 or the boundaries between the weld and the plates will be reflected back toward the transducer 42 where the mechanical vibrations will be converted into electrical vibrations, or wave trains, and amplified by an echo pulse amplifier and video detector 130, which is connected to the piezoelectric crystal 126.

The cathode ray tube 77 is both deflection and intensity modulated to produce the aforementioned "B-scan." The horizontal deflection is governed by the sweep or time base waves $l$ and $m$ supplied by the sweep amplifier 108 and the vertical deflection by pyramid waves $h$ and $i$ originating at the pyramid wave generator 106. Intensity modulation of the cathode ray tube beam is accomplished by biasing the tube to be cut off during its quiescent period and applying a positive modulation signal or signals to a control grid 132. Thus, when no signal is supplied to the control grid 132, no spot or trace appears upon the face 82 of the cathode ray tube 77. The intensity modulating signal supplied to the grid 132 has two components. The first is derived from the step wave $k$ generated by the sweep generator 102 and supplied to the gate control 110. When this signal is supplied to the control grid 132 of the cathode ray tube, a low level intensification, i.e., brightness of the cathode ray tube beam occurs during the sweep of the cathode ray beam across its face 77. The intensity of the trace is controlled by the operator by adjusting the gate control 110, which adjusts the height, i.e., voltage of the squarewave $o$ supplied to the control grid 132. Thus, the operator may adjust the gate control 110 until a path of the ultrasonic beam within the test specimen 22 is just visible.

The echo signals produced by the piezoelectric crystal 126 are amplified by the amplifier and video detector 130 and supplied to a combination amplitude discriminator and limiter, preferably a "Schmitt" trigger circuit 134. This circuit provides a constant amplitude output pulse $p$ when the input signal exceeds a predetermined magnitude; thus performing the two functions of limiting, to prevent the output signal from overdriving the cathode ray tube grid, and discrimination to exclude small signals such as produced by noise, etc. The "Schmitt" trigger circuit 134 also shapes the output signal $s$ so that it appears as shown on FIGURE 7. Thus, the output of the "Schmitt" trigger is the "A-scan" previously described. The output or echo signals $s$ from the "Schmitt" trigger 134 and the cathode ray tube gate signal $o$ from the gate control 110 are both supplied to a mixer network 136. This mixer is essentially an adder circuit in that the output is proportional to the sum of both input signals. It may thus be seen that when the gate signal brightens the cathode ray tube trace just sufficiently to make the pyramid wave visible thus simulating the path of the ultrasonic beam, an echo signal will further intensify the cathode ray tube trace thus displaying the relationship between the defect and the ultrasonic beam at that instant. When the transparency 84 is placed on the cathode ray tube face 77, the position of the defect in the test specimen 22 is shown.

The cathode ray tube trace or spot is centered in the following manner. For the vertical deflecting plates it is quite conventional, that is, a centering voltage is applied to each of the vertical plates 122, 124 of the cathode ray tube through load resistors 138 and 140. This voltage is controlled by the double potentiometer 142, 144. After the spot or trace has been adjusted vertically by adjusting the double potentiometer 142, 144, it is clamped through the action of the double diode 146. As is well known to those skilled in the art, a pair of large capacitors 148, 150 are used in this circuit.

One of the major features of the present invention is that the horizontal position of the cathode ray tube display is related to the position of the ultrasonic transducer 42 with respect to the weldment 22. By reference to FIGURE 7 it will be seen that load resistors 152 and 154 and a double clamping diode 156 are connected to the horizontal deflecting plates 112, 114 in the same manner as load resistors 138 and 140 and double diode 146 are connected to the vertical deflection plates 122 and 124. These components have the same function and the same values as those used in the vertical deflection circuitry. However, a double cathode follower 158 and associated components have been interposed between the clamping diodes 156 and the double potentiometer 70. The purpose of the double cathode follower and associated circuitry is to transform the high impedance positioning voltages produced by the double potentiometer 70 to a very low impedance suitable for clamping voltages for the diode clamp tube 156, while maintaining a fast response. The cathode follower circuit eliminates the large capacitors 148 and 150 from the clamping circuitry, these capacitors introducing a delay between adjustment of the double potentiometer 142, 144 and movement of the cathode ray tube spot. The double cathode follower 158 may be a double triode such as type 12AU7 and the biasing resistors 164 and 166 then have a resistance of approximately 0.1 megohms.

Thus, when the ultrasonic transducer 42 is moved along the test specimen 22 in a direction toward or away from the weld 24, the setting of the double potentiometer 70 will be varied and the relative horizontal position of the trace on the face of the cathode ray tube will change; the double potentiometer producing a data plot for coordinating the position of the ultrasonic transducer 42 to the cathode ray tube display. The variable ratio linkage 90 makes possible full adjustment of the double potentiometer 70 so that the horizontal position of the cathode ray tube trace may be varied full scale regardless of the length of transducer scan required for a particular weldment. Although a mechanical variable ratio linkage 90 has been shown herein and a double ganged potentiometer 70 is used as the position transducer for generating this data plot, it will be obvious to those skilled in the art that other position transducers may be used and that an electronic control may be substituted for the mechanical variable linkage 90.

It will thus be seen that the objects set forth above among those made apparent from the preceding description are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. The ultrasonic inspection method comprising the steps of generating a succession of incident ultrasonic waves, successively introducing said incident waves into the surface of a test body at a succession of entry points and at an angle to said body whereby the waves obliquely traverse the body through internal deflection from surfaces thereof, sensing the reflections of said incident waves from within said test body, developing an electric reflected signal that is delayed in accordance with the delay of said reflections with respect to said incident waves, applying to the horizontal deflection plates of a cathode ray tube a time based sweep signal, applying to the vertical plates of said cathode ray tube a pyramid wave having peaks corresponding to points of internal deflection of said incident ultrasonic waves at said surface boundaries within said body, intensity modulating said cathode ray tube with said reflected signals to display on said tube the relative position in said body of the material discontinuities from which said reflections arise, providing a position signal proportional to the successive positions of said entry points and applying said position signal to said horizontal deflection plates to change the position of said display in synchronism with changes between successive entry points, whereby said discontinuities in said test body are displayed at substantially stationary positions.

2. In non-destructive materials testing for locating defects in a test body having first and second sides substantially parallel to each other, the method comprising the steps of generating a succession of ultrasonic signals, successively moving a transducer to introduce said ultrasonic signals into said test body at an oblique angle to said sides to cause said signals to successively transversely propagate within said body along a plurality of paths, sensing the reflections of said ultrasonic signals from said test piece, developing an electric signal in response to said reflections and having a relative time delay proportional to the time delay of said reflections with respect to said introduced ultrasonic signals, generating a substantially pyramid wave having substantially equal linear periods of rise and fall, said periods corresponding to the propagation time of said ultrasonic signals between said first and second sides, applying said pyramid wave to display apparatus, applying said reflected signal to said display apparatus to intensity modulate the display, synchronizing said reflected signal with said pyramid wave to display said signal and said wave as a function of time along a first axis orthogonal to a second axis corresponding to a time base, the coordinates along said first and second axes corresponding to the physical path within said test body along which said ultrasonic signals propagate, successively varying the amplitude of a position signal in accordance with the motion of said transducer, applying said position signal to said display apparatus to move said display in synchronism with the change between said paths, whereby the locations of the same discontinuities in said test body are displayed in substantially the same positions when said transducer is successively moved to introduce said wave along said different paths.

3. An ultrasonic inspection method comprising the steps of
 (1) successively introducing ultrasonic waves into a test part at each of several positions on a surface thereof and at an angle other than 90° relative to that surface such that the waves travel through the part in pyramidal patterns,
 (2) developing for each such wave introduction a pyramidal display pattern on a cathode ray tube face, simulating the shape of the pattern of travel of the waves through the part,
 (3) indicating on each such pattern when an ultrasonic echo is received at the point of introduction of the corresponding waves into the part,
 (4) relating the rate of development of each such pattern to the rate of propagation of the corresponding waves through said part so that the location on each pattern of the aforesaid indication corresponds to the location in said part of the portion of said part generating said ultrasonic echo,
 (5) providing a position signal proportional to the position at which said ultrasonic waves are introduced,
 (6) and shifting the position of the successive display patterns in response to said position signal so that the same echo generating portion of said part is displayed on successive display patterns in the same location in space.

4. Ultrasonic inspection display apparatus comprising in combination, ultrasonic transducer means for introducing ultrasonic energy into a test piece at an angle other than 90° to the surface of the piece, the energy being directed through the piece in a pyramidal pattern by reflection of the energy from faces of the piece, a cathode ray tube, a pulse repetition frequency generator, a first wave train generator connected to said pulse repetition frequency generator to produce a wave train for said ultrasonic transducer upon receipt of a pulse from said pulse repetition frequency generator, a sweep generator connected to said pulse repetition frequency generator and to the deflection plates of said cathode ray tube defining a first axis on the face of said cathode ray tube, said sweep generator thereby producing a sweep of the cathode ray tube trace across the face of said cathode ray tube upon receipt of a pulse from said pulse repetition frequency generator, a second wave train generator also connected to and actuated by a pulse from said pulse repetition generator, and connected to a second pair of deflecting plates of said cathode ray tube defining a second axis on the face of the cathode ray tube perpendicular to said first axis, said wave train generators coacting to produce a pattern on the face of said cathode ray tube simulating the pyramidal pattern of travel of the ultrasonic energy through said test piece, a position transducer, sweep axis positioning means connected to said first pair of deflection plates and to said position transducer whereby the pattern produced on the face of said cathode ray tube by the combined deflection of said first and second pairs of deflection plates may be moved along said first axis according to the data plot produced by said position transducer, and echo detecting means connected to said ultrasonic transducer and to said cathode ray tube and operative to modulate the pattern on said cathode ray tube upon the receipt of ultrasonic echoes by said ultrasonic transducer.

5. Ultrasonic inspection display apparatus comprising in combination an ultrasonic transducer, a cathode ray tube, a pulse repetition frequency generator, a first wave train generator connected to said pulse repetition frequency generator to produce a wave train for said ultrasonic transducer upon receipt of a pulse from said pulse repetition frequency generator, a sweep generator connected to said pulse repetition frequency generator and to the deflection plates of said cathode ray tube defining a first axis on the face of said cathode ray tube, said sweep generator producing a linear rise, instantaneous decay saw tooth wave form to produce a sweep trace across the face of said cathode ray tube upon receipt of a pulse from said pulse repetition frequency generator, a second wave train generator also connected to and actuated by a pulse from said pulse repetition generator, and connected to a second pair of deflecting plates of said cathode ray tube defining a second axis on the face of the cathode ray tube perpendicular to said first axis, said second wave train generator producing a linear rise, linear decay pyramidal wave form, whereby said wave train generators coact to produce a pattern on the face of said cathode ray tube simulating the pattern of travel of ultrasonic waves in a test part, a position transducer, sweep axis positioning means connected to said first pair of deflection plates and to said position transducer whereby the pattern produced on the face of said cathode ray tube by the combined deflection of said first and second pairs of deflection plates may be moved along said first axis according to the data plot produced by said position transducer, and echo detecting means connected to said ultrasonic transducer and to said cathode ray tube and operative to modulate the pattern on said cathode ray tube upon the receipt of ultrasonic echoes by said ultrasonic transducer.

6. Ultrasonic inspection apparatus, comprising in combination,
 (1) a transducer for directing ultrasonic energy into a test part,
 (2) movable mounting means supporting said transducer for movement of said transducer along a surface of the part in the mean direction of travel of ultrasonic energy directed through the part,
 (3) oscilloscope means for providing a trace pattern corresponding to the path of the ultrasonic energy moving through the part,
 (4) electronic means for receiving reflected ultrasonic energy from the part and for modulating said trace pattern in response thereto
  (a) at a location on said trace pattern corresponding to a location of energy reflection in the part, and
 (5) electronic means connecting said transducer mounting means and said oscilloscope means for shifting said display pattern in corresponding proportion to movement of said transducer
whereby the representation of the part on said oscilloscope trace pattern remains fixed irrespective of movement of said transducer.

7. The combination defined in claim 4 and delay circuits interposed between said pulse repetition frequency generator and said first wave train generator, said sweep generator and said second wave train generator whereby the relative timing of the action of the said generators may be preset.

8. The combination defined in claim 5 and echo responsive means connected to the intensity control grid of said cathode ray tube and connectable to an ultrasonic transducer, whereby the trace of said cathode ray tube is intensity modulated upon receipt of an echo at an ultrasonic transducer connected to said echo responsive means.

9. The combination defined in claim 8 further defined in that said echo responsive means comprises an amplifier video detector and discriminator limiter.

References Cited by the Examiner
UNITED STATES PATENTS

| | | | |
|---|---|---|---|
| 2,586,743 | 2/52 | Thresher et al. | 178—7.83 |
| 2,593,865 | 4/52 | Erdman | 73—67.8 |
| 2,740,289 | 4/56 | Van Valkenburg et al. | 73—67.9 |

RICHARD C. QUEISSER, *Primary Examiner.*

CHARLES CUTTING, ROBERT EVANS, *Examiners.*

UNITED STATES PATENT OFFICE
CERTIFICATE OF CORRECTION

April 20, 1965

Patent No. 3,178,933

Peter K. Bloch et al.

It is hereby certified that error appears in the above numbered patent requiring correction and that the said Letters Patent should read as corrected below.

Column 5, line 16, for "as" read -- at --.

Signed and sealed this 21st day of September 1965.

(SEAL)
Attest:

ERNEST W. SWIDER
Attesting Officer

EDWARD J. BRENNER
Commissioner of Patents